United States Patent
Kato et al.

(10) Patent No.: US 11,097,734 B2
(45) Date of Patent: Aug. 24, 2021

(54) VEHICLE CONTROL DEVICE, VEHICLE, AND VEHICLE CONTROL METHOD

(71) Applicant: HONDA MOTOR CO., LTD., Tokyo (JP)

(72) Inventors: Daichi Kato, Wako (JP); Tadahiko Kanoh, Wako (JP); Kanta Tsuji, Wako (JP); Atsushi Ishioka, Wako (JP); Katsuya Yashiro, Wako (JP); Nozomu Hirosawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 16/781,451

(22) Filed: Feb. 4, 2020

(65) Prior Publication Data
US 2020/0247417 A1    Aug. 6, 2020

(30) Foreign Application Priority Data

Feb. 6, 2019  (JP) .............................. JP2019-019306

(51) Int. Cl.
*B60W 30/18*   (2012.01)
*B60W 30/14*   (2006.01)

(52) U.S. Cl.
CPC .... *B60W 30/18163* (2013.01); *B60W 30/143* (2013.01); *B60W 2420/30* (2013.01); *B60W 2720/10* (2013.01)

(58) Field of Classification Search
CPC .............................................. B60W 30/18163
See application file for complete search history.

(56) References Cited

U.S. PATENT DOCUMENTS

| | | | |
|---|---|---|---|
| 9,836,051 B2* | 12/2017 | Ishikawa ............... | B60W 30/12 |
| 10,202,123 B2* | 2/2019 | Aoki ...................... | B60W 10/30 |
| 10,909,855 B2* | 2/2021 | Ide ....................... | B62D 15/0255 |
| 2016/0137199 A1* | 5/2016 | Kuhne ................. | B60W 30/09 701/41 |
| 2018/0099676 A1* | 4/2018 | Goto ..................... | B60W 30/10 |
| 2018/0222422 A1* | 8/2018 | Takae .............. | B60W 30/18163 |
| 2018/0222423 A1* | 8/2018 | Takae .................. | B60R 21/0134 |
| 2019/0143982 A1* | 5/2019 | Hashimoto ........... | B60W 30/12 701/23 |
| 2019/0143983 A1* | 5/2019 | Hashimoto .......... | G05D 1/0088 701/23 |
| 2020/0114933 A1* | 4/2020 | Ono ....................... | B60K 35/00 |

FOREIGN PATENT DOCUMENTS

JP            6252399 B2    12/2017

* cited by examiner

*Primary Examiner* — Alex C Dunn
(74) *Attorney, Agent, or Firm* — Carrier Blackman & Associates, P.C.; Joseph P. Carrier; William D. Blackman

(57) ABSTRACT

A vehicle control device includes: an operation detection unit that detects an operation input of a user for an operation input unit; a speed setting unit that sets travel speed of a host vehicle on the basis of the operation input that is detected by the operation detection unit; and a lane change control unit that controls lane change. If the operation input that decreases, by more than or equal to a predetermined degree, setting travel speed that is the speed set by the speed setting unit, or the operation input that decreases the setting travel speed to be lower than current travel speed of the host vehicle, is performed after the lane change is started, the lane change control unit cancels the lane change.

7 Claims, 5 Drawing Sheets

VEHICLE CONTROL DEVICE, VEHICLE, AND VEHICLE CONTROL METHOD

CROSS-REFERENCE TO RELATED APPLICATION

This application is based upon and claims the benefit of priority from Japanese Patent Application No. 2019-019306 filed on Feb. 6, 2019, the contents of which are incorporated herein by reference.

BACKGROUND OF THE INVENTION

Field of the Invention

The present invention relates to a vehicle control device, a vehicle, and a vehicle control method.

Description of the Related Art

In recent years, a vehicle control device that can control lane change has been suggested. Japanese Patent No. 6252399 discloses that if brake operation deceleration is more than or equal to an estimated deceleration threshold, assistance control for the lane change of a host vehicle to an adjacent lane is canceled.

SUMMARY OF THE INVENTION

However, by the suggested vehicle control device, travel control is not always sufficiently successfully performed.

It is an object of the present invention to provide a vehicle control device, a vehicle, and a vehicle control method in which travel control can be achieved successfully.

A vehicle control device according to one aspect of the present invention includes: an operation detection unit configured to detect an operation input of a user for an operation input unit; a speed setting unit configured to set travel speed of a host vehicle on a basis of the operation input that is detected by the operation detection unit; and a lane change control unit configured to control lane change, wherein if the operation input that decreases, by more than or equal to a predetermined degree, setting travel speed that is the travel speed set by the speed setting unit, or the operation input that decreases the setting travel speed to be lower than current travel speed of the host vehicle, is performed after the lane change is started, the lane change control unit cancels the lane change.

A vehicle according to another aspect of the present invention includes the vehicle control device as described above.

A vehicle control method according to another aspect of the present invention includes steps of: setting travel speed of a host vehicle on a basis of operation input that is performed by a user; and controlling lane change, wherein, in the step of controlling the lane change, if the operation input that decreases, by more than or equal to a predetermined degree, setting travel speed that is the travel speed set in the step of setting the travel speed, or the operation input that decreases the setting travel speed to be lower than current travel speed of the host vehicle, is performed after the lane change is started, the lane change is canceled.

According to the present invention, the vehicle control device, the vehicle, and the vehicle control method in which travel control can be achieved successfully can be provided.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a vehicle control device, a vehicle, and a vehicle control method according to the present invention is hereinafter described in detail with reference to the attached drawings.

Embodiment

Figure 1:
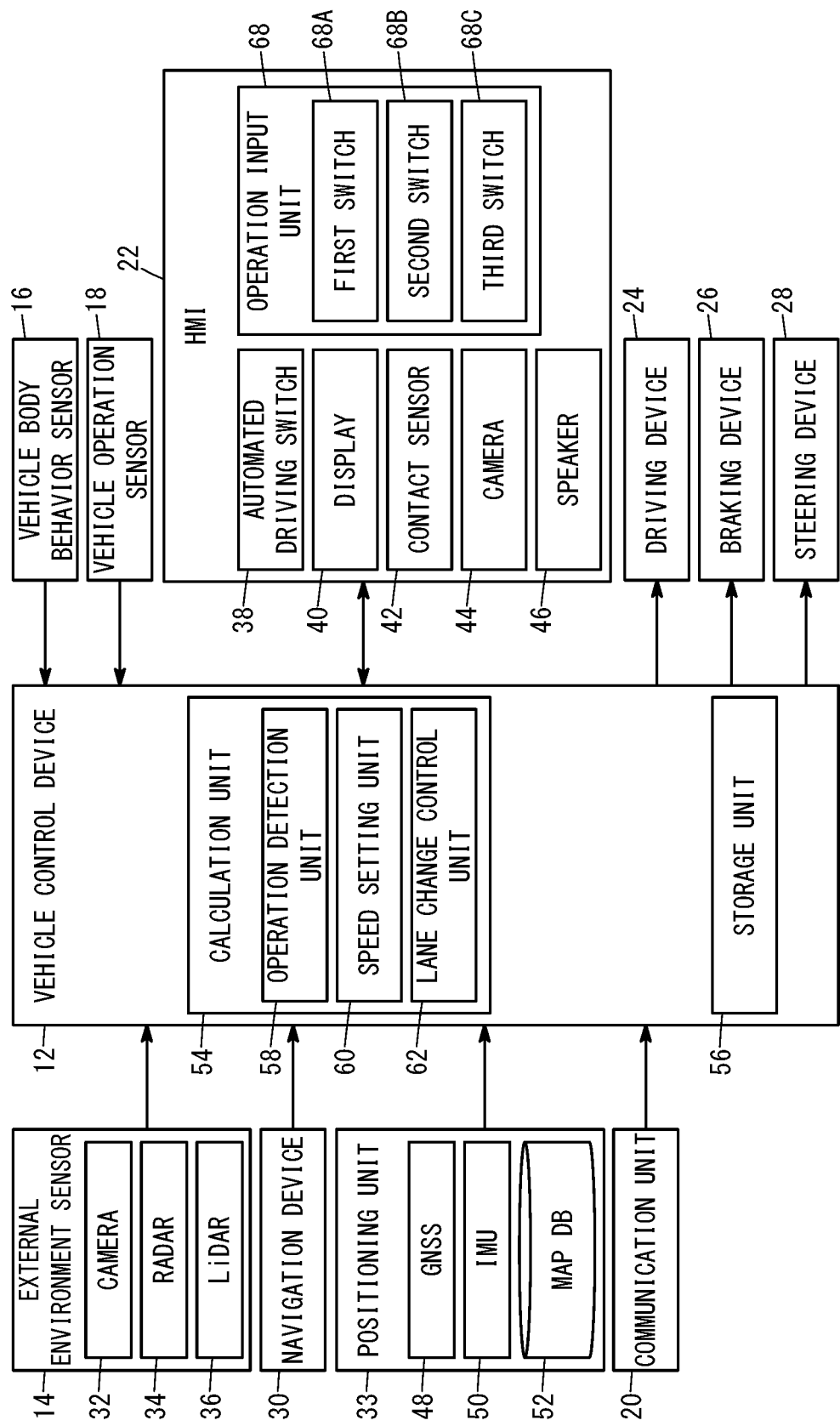
FIG. 1 is a block diagram expressing a vehicle according to one embodiment.

The vehicle control device, the vehicle, and the vehicle control method according to one embodiment are described with reference to the drawings. FIG. 1 is a block diagram expressing the vehicle according to the present embodiment.

A vehicle (host vehicle) 10 includes a vehicle control device 12, that is, a vehicle control ECU (Electronic Control Unit). The vehicle 10 further includes an external environment sensor 14, a vehicle body behavior sensor 16, a vehicle operation sensor 18, a communication unit 20, and an HMI (Human Machine Interface) 22. The vehicle 10 further includes a driving device 24, a braking device 26, a steering device 28, a navigation device 30, and a positioning unit 33. The vehicle 10 also includes components other than these components; however, the description thereof is omitted.

The external environment sensor 14 acquires external environment information, that is, peripheral information of the vehicle 10. The external environment sensor 14 includes a plurality of cameras 32 and a plurality of radar devices 34. The external environment sensor 14 further includes a plurality of LiDAR (Light Detection And Ranging, Laser imaging Detection And Ranging) devices 36.

Information acquired by the cameras (imaging units) 32, that is, camera information is supplied to the vehicle control device 12 from the cameras 32. Examples of the camera information include imaging information. The camera information, and radar information and LiDAR information to be described below form the external environment information. In FIG. 1, one camera 32 is illustrated; however, a plurality of cameras 32 are actually provided.

The radar devices 34 output transmission waves to the outside of the vehicle 10, and receive reflection waves of the output transmission waves that have reflected on a detected object and returned. Examples of the transmission waves include electromagnetic waves. Examples of the electromagnetic waves include millimeter waves. Examples of the detected object include another vehicle 76 including a preceding vehicle (see FIG. 3). The radar devices 34 generate the radar information (reflection wave signal) on the basis of the reflection waves or the like. The radar devices 34 supply the generated radar information to the vehicle control device 12. In FIG. 1, one radar device 34 is illustrated; however, a plurality of radar devices 34 are actually provided to the vehicle 10. Note that the radar devices 34 are not limited to using millimeter wave radar. For example, laser radar devices, ultrasonic sensors, or the like may be used as the radar devices 34.

The LiDAR devices 36 continuously output lasers in all directions of the vehicle 10, measure a three-dimensional position of a reflection point on the basis of the reflection waves of the output lasers, and output information about the three-dimensional position, that is, three-dimensional information. The LiDAR devices 36 supply the three-dimensional information, that is, the LiDAR information to the vehicle control device 12. In FIG. 1, one LiDAR device 36 is illustrated; however, a plurality of LiDAR devices 36 are actually provided to the vehicle 10.

The vehicle body behavior sensor 16 acquires information about behavior of the vehicle 10, that is, vehicle body behavior information. The vehicle body behavior sensor 16 includes a vehicle speed sensor (not shown), a wheel speed sensor (not shown), an acceleration sensor (not shown), and a yaw rate sensor (not shown). The vehicle speed sensor detects speed of the vehicle 10, that is, vehicle speed. In addition, the vehicle speed sensor further detects a travel direction of the vehicle 10. The wheel speed sensor detects speed of wheels (not shown), that is, wheel speed. The acceleration sensor detects acceleration of the vehicle 10. The acceleration includes front-rear acceleration, lateral acceleration, and up-down acceleration. Note that the acceleration sensor may detect the acceleration in only a part of directions. The yaw rate sensor detects a yaw rate of the vehicle 10.

The vehicle operation sensor (driving operation sensor) 18 acquires information about driving operation by a user (driver), that is, driving operation information. The vehicle operation sensor 18 includes an accelerator pedal sensor (not shown), a brake pedal sensor (not shown), a steering angle sensor (not shown), and a steering torque sensor (not shown). The accelerator pedal sensor detects the operation amount of an accelerator pedal (not shown). The brake pedal sensor detects the operation amount of a brake pedal (not shown). The steering angle sensor detects the steering angle of a steering wheel 74 (see FIG. 2). The steering torque sensor detects the torque applied to the steering wheel 74.

The communication unit 20 performs wireless communication with an external equipment (not shown). Examples of the external equipment include an external server (not shown). The communication unit 20 may be detachable or undetachable with respect to the vehicle 10. Examples of the communication unit 20 that is detachable with respect to the vehicle 10 include a mobile phone and a smart phone.

The HMI 22 receives operation input by a user (vehicle occupant) and provides the user with various pieces of information visually, aurally, or tactilely. The HMI 22 includes, for example, an automated driving switch (driving assist switch) 38, a display 40, a contact sensor 42, a camera 44, a speaker 46, and an operation input unit 68.

The automated driving switch 38 is used by the user in order to instruct starting or stopping automated driving. The automated driving switch 38 includes a start switch (not shown) and a stop switch (not shown). The start switch outputs a start signal to the vehicle control device 12 in accordance with the operation of the user. The stop switch outputs a stop signal to the vehicle control device 12 in accordance with the operation of the user.

Examples of the display (display unit) 40 include a liquid crystal panel and an organic EL panel. In this example, the display 40 is a touch panel, but is not limited thereto.

The contact sensor 42 detects whether the user (driver) is in contact with the steering wheel 74. A signal output from the contact sensor 42 is supplied to the vehicle control device 12. The vehicle control device 12 can determine whether the user is in contact with the steering wheel 74 on the basis of the signal supplied from the contact sensor 42.

The camera 44 captures images of the inside of the vehicle 10, that is, the inside of a vehicle compartment (not shown). For example, the camera 44 may be provided to a dashboard (not shown), or the ceiling (not shown). In addition, the camera 44 may be provided so as to capture images of only the driver, or may be provided so as to capture images of each of the vehicle occupants. The camera 44 outputs information that is acquired by capturing images of the inside of the vehicle compartment, that is, image information to the vehicle control device 12.

The speaker 46 provides the user with various pieces of information by a sound. The vehicle control device 12 outputs various notices, warnings or the like through the speaker 46.

The operation input unit 68 is, for example, a button for setting cruise control, that is, a cruise control button. The cruise control is a function capable of keeping the travel speed of the host vehicle 10 at setting travel speed that is set in advance even if the user does not step on the accelerator pedal.

Figure 2:
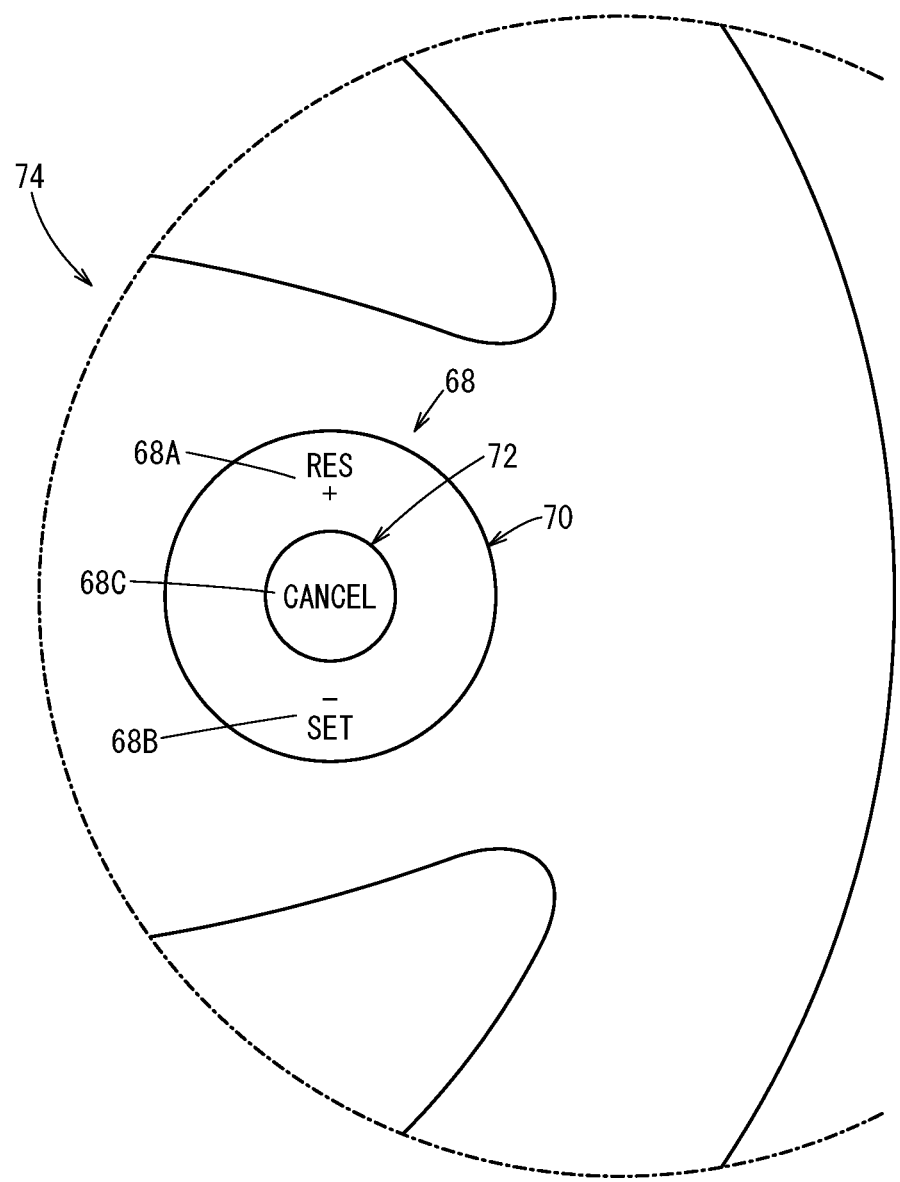
FIG. 2 is a diagram expressing an example of an operation input unit.

FIG. 2 is a diagram expressing an example of the operation input unit. For example, the operation input unit 68 is provided to the steering wheel 74. The operation input unit 68 includes, for example, a push button 70 with a ring shape and a push button 72 with a circular shape. The push button 70 is positioned around the push button 72. The operation input unit 68 includes a first switch 68A (see FIG. 1), a second switch 68B (see FIG. 1), and a third switch 68C (see FIG. 1). When an upper part of the push button 70 is pushed, the first switch 68A is brought into an on state. When a lower part of the push button 70 is pushed, the second switch 68B is brought into the on state. When the push button 72 is pushed, the third switch 68C is brought into the on state. The first switch 68A is a resume switch, for example. The second switch 68B is a set switch, for example. The third switch 68C is a cancel switch, for example. The operation input unit 68 supplies a signal expressing an operation state for the first switch 68A, the second switch 68B, and the third switch 68C, to an operation detection unit 58 that is described below.

The driving device (driving force control system) 24 includes a driving ECU (not shown) and a driving source (not shown). The driving ECU controls the driving source so as to control driving force (torque) of the vehicle 10. Examples of the driving source include an engine and a driving motor. The driving ECU can control the driving force by controlling the driving source on the basis of the operation of the user for the accelerator pedal. In addition, the driving ECU can control the driving force by controlling the driving source on the basis of an instruction supplied from the vehicle control device 12. The driving force of the driving source is transmitted to the wheels (not shown) through a transmission (not shown) or the like.

The braking device (braking force control system) 26 includes a braking ECU (not shown) and a brake mechanism (not shown). The brake mechanism operates a brake member by a brake motor, a hydraulic mechanism, or the like. The braking ECU can control braking force by controlling the brake mechanism on the basis of the operation of the user for the brake pedal. In addition, the braking ECU can control the braking force by controlling the brake mechanism on the basis of an instruction supplied from the vehicle control device 12.

The steering device (steering system) 28 includes a steering ECU (not shown), that is, an EPS (electric power steering system) ECU and a steering motor (not shown). The steering ECU controls the steering motor on the basis of the operation of the user for the steering wheel 74 so as to control the direction of the wheels (steering wheels). In addition, the steering ECU controls the steering motor on the basis of an instruction supplied from the vehicle control device 12 so as to control the direction of the wheels. Note that the steering may be performed by changing torque distribution or braking force distribution to the left and right wheels.

The navigation device 30 includes a GNSS (Global Navigation Satellite System) sensor (not shown). In addition, the navigation device 30 further includes a calculation unit (not shown) and a storage unit (not shown). The GNSS sensor detects a current position of the vehicle 10. The calculation unit reads out map information corresponding to the current position that is detected by the GNSS sensor, from a map database (not shown) that is stored in the storage unit. The calculation unit determines a target route from the current position to a destination by using the map information. Note that the destination is input by the user through the HMI 22. As described above, the display 40 is the touch panel. When the user operates the touch panel, the destination is input. The navigation device 30 outputs the generated target route to the vehicle control device 12. The vehicle control device 12 supplies the target route to the HMI 22. The HMI 22 causes the display 40 to display the target route.

The positioning unit 33 includes a GNSS 48. The positioning unit 33 further includes an IMU (Inertial Measurement Unit) 50 and a map database (map DB) 52. The positioning unit 33 specifies the position of the vehicle 10 by appropriately using information acquired by the GNSS 48, information acquired by the IMU 50, and map information stored in the map database 52. The positioning unit 33 can supply host vehicle position information, which is information expressing the position of the host vehicle 10, to the vehicle control device 12. In addition, the positioning unit 33 can supply the map information to the vehicle control device 12.

The vehicle control device 12 includes a calculation unit 54 and a storage unit 56. The calculation unit 54 controls the vehicle control device 12 entirely. The calculation unit 54 is formed of a CPU (Central Processing Unit), for example. The calculation unit 54 executes vehicle control by controlling each unit on the basis of programs stored in the storage unit 56.

The calculation unit 54 includes the operation detection unit 58, a speed setting unit 60, and a lane change control unit 62. The calculation unit 54 executes the programs stored in the storage unit 56, so that the operation detection unit 58, the speed setting unit 60, and the lane change control unit 62 can be achieved.

The operation detection unit 58 detects the operation input of the user for the operation input unit 68 on the basis of the signal supplied from the operation input unit 68. As described above, the signal supplied from the operation input unit 68 is the signal expressing whether each of the first switch 68A, the second switch 68B, and the third switch 68C is in the on state or an off state.

The speed setting unit 60 sets the travel speed of the host vehicle 10, that is, the setting travel speed on the basis of the operation input that is detected by the operation detection unit 58. Each time the first switch 68A, that is, the resume switch is pushed, the speed setting unit 60 increases the setting travel speed by about 1.5 km/h, for example. Each time the second switch 68B, that is, the set switch is pushed, the speed setting unit 60 decreases the setting travel speed by 1.5 km/h, for example.

Figure 3:
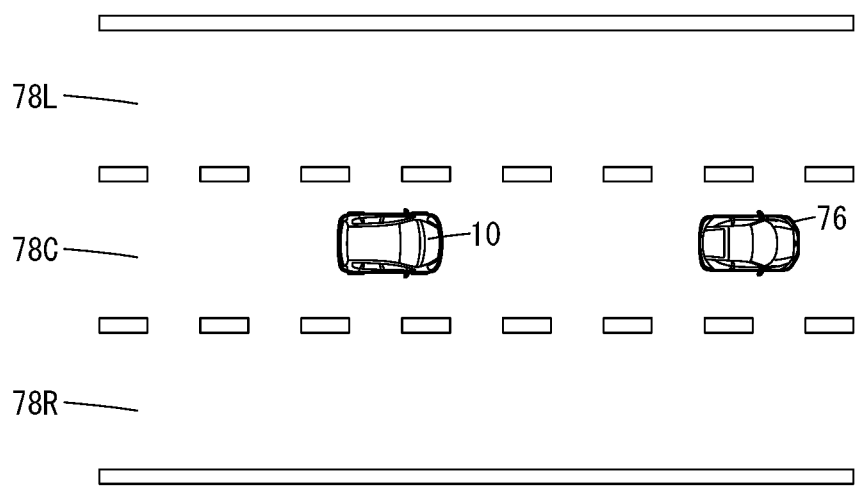
FIG. 3 is a diagram expressing an example of travel lanes.

FIG. 3 is a diagram expressing an example of travel lanes. In the example illustrated in FIG. 3, the host vehicle 10 and the preceding vehicle 76 travel in a lane 78C. On one side (right side) of the host vehicle lane (lane) 78C where the host vehicle 10 travels, a first lane (lane, adjacent lane) 78R is positioned. On the other side (left side) of the host vehicle lane (lane) 78C where the host vehicle 10 travels, a second lane (lane, adjacent lane) 78L is positioned. Note that FIG. 3 illustrates the example in which only one other vehicle (preceding vehicle) 76 exists ahead of the host vehicle 10; however, the number of other vehicles is not limited to one. A plurality of other vehicles 76 may exist. Moreover, the other vehicle 76 may exist in the first lane 78R, or the other vehicle 76 may exist in the second lane 78L. Note that when the lane is described generally, the sign 78 is used, and when each of the lanes is described, the signs 78C, 78L, 78R are used.

The lane change control unit (control unit) 62 controls lane change. When the operation input that decreases the setting travel speed by more than or equal to a predetermined degree is performed after the lane change is started, the lane change control unit 62 cancels the lane change. When the operation input that decreases the setting travel speed to be lower than the current travel speed of the host vehicle 10 is performed after the lane change is started, the lane change control unit 62 cancels the lane change. This lane change is lane change to overtake the preceding vehicle 76, for example.

When canceling the lane change in a state where the host vehicle 10 and the preceding vehicle 76 travel side by side, the lane change control unit 62 positions the host vehicle 10 behind the preceding vehicle 76.

When the lane 78 to which the host vehicle 10 will shift is the lane 78 that leads to the destination, the lane change control unit 62 does not cancel the lane change even if the operation input that decreases the setting travel speed by more than or equal to the predetermined degree is performed after the lane change is started. Moreover, when the lane 78 to which the host vehicle 10 will shift is the lane 78 that leads to the destination, the lane change control unit 62 does not cancel the lane change even if the operation input that decreases the setting travel speed to be lower than the current travel speed of the host vehicle 10 is performed after the lane change is started.

In a case where the lane where the host vehicle 10 travels, that is, the host vehicle lane 78 disappears ahead of the host vehicle 10, the lane change control unit 62 performs the following process. That is to say, in this case, the lane change control unit 62 does not cancel the lane change even if the operation input that decreases the setting travel speed by more than or equal to the predetermined degree is performed after the lane change is started. Moreover, in this case, the lane change control unit 62 does not cancel the lane change even if the operation input that decreases the setting travel speed to be lower than the current travel speed of the host vehicle 10 is performed after the lane change is started. Note that examples of the case where the host vehicle lane 78 disappears ahead of the host vehicle 10 include a case where the host vehicle lane 78 does not exist ahead of the host vehicle 10, and a case where the host vehicle lane 78 merges into the adjacent lane 78 that is adjacent to the host vehicle lane 78.

The storage unit 56 includes a volatile memory (not shown) and a non-volatile memory (not shown). Examples of the volatile memory include a RAM (Random Access Memory). Examples of the non-volatile memory include a ROM (Read Only Memory) and a flash memory. The external environment information, the vehicle body behavior information, vehicle operation information, and the like are stored in the volatile memory, for example. The programs, tables, the maps, and the like are stored in the non-volatile memory, for example.

Figure 4:
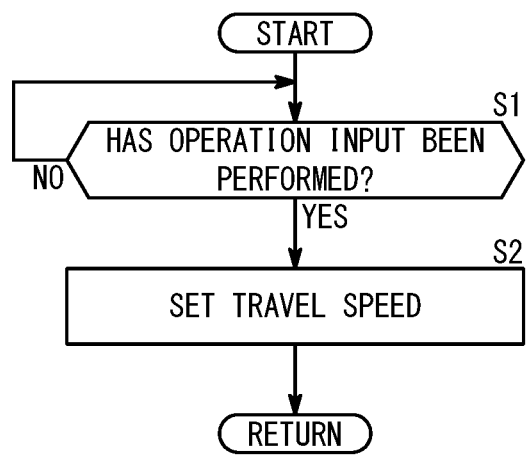
FIG. 4 is a flowchart expressing an example of operation of a vehicle control device according to the embodiment.

FIG. 4 is a flowchart expressing an example of operation of the vehicle control device according to the present embodiment.

In step S1, the operation detection unit 58 detects whether the user has performed the operation input for the operation input unit 68 on the basis of the signal supplied from the operation input unit 68. If the operation input for the operation input unit 68 has been performed (YES in step S1), the process advances to step S2. If the operation input for the operation input unit 68 has not been performed (NO in step S1), step S1 is repeated.

In step S2, the speed setting unit 60 sets the travel speed of the host vehicle 10, that is, the setting travel speed on the basis of the operation input detected by the operation detection unit 58. Each time the first switch 68A, that is, the resume switch is pushed, the speed setting unit 60 increases the setting travel speed by about 1.5 km/h, for example. Each time the second switch 68B, that is, the set switch is pushed, the speed setting unit 60 decreases the setting travel speed by 1.5 km/h, for example. Thus, the process in FIG. 4 is completed.

Figure 5:
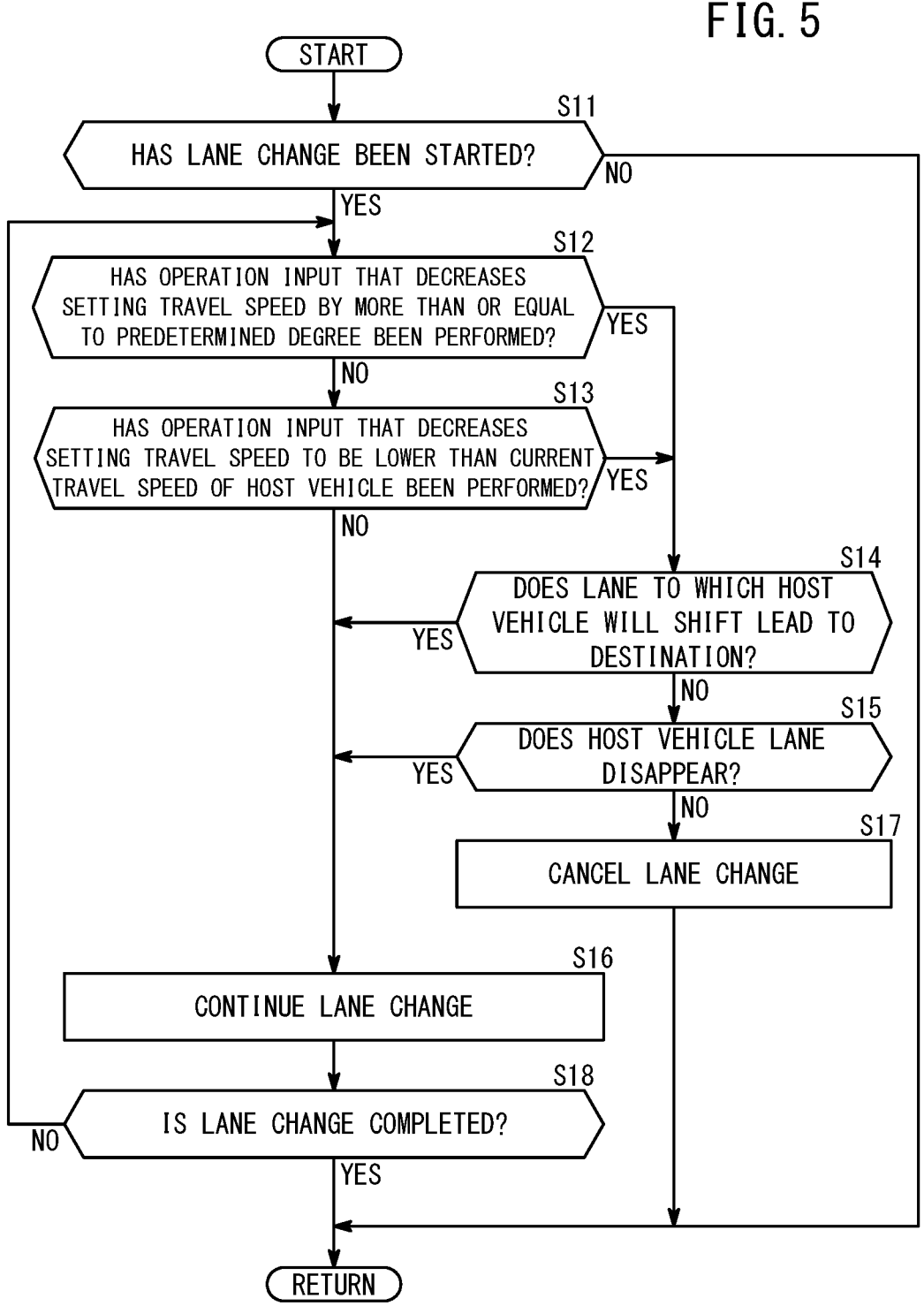
FIG. 5 is a flowchart expressing an example of operation of the vehicle control device according to the embodiment.

FIG. 5 is a flowchart expressing an example of operation of the vehicle control device according to the present embodiment.

In step S11, the calculation unit 54 determines whether the lane change control unit 62 has started the lane change. Here, the start of the lane change includes a state where the host vehicle 10 is positioned in the host vehicle lane 78 after it has been determined that the lane change is performed. If the lane change has been started (YES in step S11), the process advances to step S12. That is to say, if it has been determined that the lane change is performed, the process advances to step S12. If the lane change has not been started (NO in step S11), the process in FIG. 5 is completed. That is to say, if it has not been determined that the lane change is performed, the process in FIG. 5 is completed.

In step S12, the operation detection unit 58 determines whether the operation input that decreases the setting travel speed by more than or equal to the predetermined degree has been performed. If the operation input that decreases the setting travel speed by more than or equal to the predetermined degree has been performed (YES in step S12), the process advances to step S14. If the operation input that decreases the setting travel speed by more than or equal to the predetermined degree has not been performed (NO in step S12), the process advances to step S13.

In step S13, the operation detection unit 58 determines whether the operation input that decreases the setting travel speed to be lower than the current travel speed of the host vehicle 10 has been performed. If the operation input that decreases the setting travel speed to be lower than the current travel speed of the host vehicle 10 has been performed (YES in step S13), the process advances to step S14. If the operation input that decreases the setting travel speed to be lower than the current travel speed of the host vehicle 10 has not been performed (NO in step S13), the process advances to step S16.

In step S14, the calculation unit 54 determines whether the lane 78 to which the host vehicle 10 will shift is the lane that leads to the destination. The calculation unit 54 can determine whether the lane 78 to which the host vehicle 10 will shift is the lane that leads to the destination on the basis of the host vehicle position information and the map information. If the lane 78 to which the host vehicle 10 will shift is the lane that leads to the destination (YES in step S14), the process advances to step S16. If the lane 78 to which the host vehicle 10 will shift is not the lane that leads to the destination (NO in step S14), the process advances to step S15.

In step S15, the calculation unit 54 determines whether the host vehicle lane 78 disappears ahead of the host vehicle 10. The calculation unit 54 can determine whether the host vehicle lane 78 disappears ahead of the host vehicle 10 on the basis of the host vehicle position information and the map information. If the host vehicle lane 78 disappears ahead of the host vehicle 10 (YES in step S15), the process advances to step S16. If the host vehicle lane 78 does not disappear ahead of the host vehicle 10 (NO in step S15), the process advances to step S17.

In step S16, the lane change control unit 62 continues the lane change. After that, the process advances to step S18.

In step S17, the lane change control unit 62 cancels the lane change. If the step S17 is completed, the process in FIG. 5 is completed.

In step S18, the calculation unit 54 determines whether the lane change is completed. For example, in a case where a half or more of the host vehicle 10 in a vehicle width direction is positioned in the adjacent lane 78, the calculation unit 54 can determine that the lane change is completed. Moreover, in a case where the center line of the host vehicle 10 in a longitudinal direction coincides with the center line of the adjacent lane 78, the calculation unit 54 may determine that the lane change is completed. If the lane change is not completed (NO in step S18), the processes in and after step S12 are performed again. If the lane change is completed (YES in step S18), the process in FIG. 5 is completed.

As described above, according to the present embodiment, if the operation input that decreases the setting travel speed by more than or equal to the predetermined degree, or the operation input that decreases the setting travel speed to be lower than the current travel speed of the host vehicle 10, is performed after the lane change is started, the lane change is canceled. If the setting travel speed is decreased by more than or equal to the predetermined degree or the setting travel speed is decreased to be lower than the current travel speed of the host vehicle 10, the lane change is not always successfully performed. According to the present embodiment, since the lane change is canceled in these cases, the travel control can be achieved successfully.

The preferred embodiment of the present invention has been described; however, the present invention is not limited to the aforementioned embodiment and various modifications are possible without departing from the concept of the present invention.

The above embodiment can be summarized as follows.

The vehicle control device (12) includes: the operation detection unit (58) configured to detect the operation input of the user for the operation input unit (68); the speed setting unit (60) configured to set the travel speed of the host vehicle (10) on the basis of the operation input that is detected by the operation detection unit; and the lane change control unit (62) configured to control the lane change, wherein if the operation input that decreases, by more than or equal to the predetermined degree, the setting travel speed that is the travel speed set by the speed setting unit, or the operation input that decreases the setting travel speed to be lower than the current travel speed of the host vehicle, is performed after the lane change is started, the lane change control unit cancels the lane change. In the above configuration, if the operation input that decreases the setting travel speed by more than or equal to the predetermined degree, or the operation input that decreases the setting travel speed to be lower than the current travel speed of the host vehicle, is performed after the lane change is started, the lane change is canceled. If the setting travel speed is decreased by more than or equal to the predetermined degree or the setting travel speed is decreased to be lower than the current travel speed of the host vehicle, the lane change is not always successfully performed. In the above configuration, since the lane change is canceled in these cases, the travel control can be achieved successfully.

If the operation input that decreases the setting travel speed by more than or equal to the predetermined degree, or the operation input that decreases the setting travel speed to be lower than the current travel speed of the host vehicle, is performed after the lane change to overtake the preceding vehicle (76) is started, the lane change control unit may cancel the lane change. If the setting travel speed is decreased by more than or equal to the predetermined degree after the lane change to overtake the preceding vehicle is started, the lane change is not always successfully performed. Moreover, if the setting travel speed is decreased to be lower than the current travel speed of the host vehicle after the lane change to overtake the preceding vehicle is started, the lane change is not always successfully performed. In the above configuration, since the lane change is canceled in these cases, the travel control can be achieved successfully.

When canceling the lane change in the state where the host vehicle and the preceding vehicle travel side by side, the lane change control unit may position the host vehicle behind the preceding vehicle. In the above configuration, since the host vehicle is positioned behind the preceding vehicle, the travel control can be achieved successfully.

When the lane (78) to which the host vehicle shifts is the lane that leads to the destination, the lane change control unit may not cancel the lane change even if the operation input that decreases the setting travel speed by more than or equal to the predetermined degree, or the operation input that decreases the setting travel speed to be lower than the current travel speed of the host vehicle, is performed after the lane change is started. In the above configuration, the vehicle can travel successfully toward the destination.

In the case where the host vehicle lane that is the lane where the host vehicle travels disappears ahead of the host vehicle, the lane change control unit may not cancel the lane change even if the operation input that decreases the setting travel speed by more than or equal to the predetermined degree, or the operation input that decreases the setting travel speed to be lower than the current travel speed of the host vehicle, is performed after the lane change is started. In the above configuration, the host vehicle can perform the lane change to the adjacent lane for sure.

The vehicle (10) includes the vehicle control device as described above.

The vehicle control method includes: the step (S2) of setting the travel speed of the host vehicle on the basis of the operation input that is performed by the user; and the step (S11 to S18) of controlling the lane change, wherein, in the step of controlling the lane change, if the operation input that decreases, by more than or equal to the predetermined degree, the setting travel speed that is the travel speed set in the step of setting the travel speed (S12), or the operation input that decreases the setting travel speed to be lower than the current travel speed of the host vehicle (S13), is performed after the lane change is started (S11), the lane change is canceled (S17).

What is claimed is:

1. A vehicle control device comprising:
    an operation detection unit configured to detect an operation input of a user for an operation input unit;
    a speed setting unit configured to set travel speed of a host vehicle on a basis of the operation input that is detected by the operation detection unit; and
    a lane change control unit configured to control lane change, wherein
    if the operation input that decreases, by more than or equal to a predetermined degree, setting travel speed that is the travel speed set by the speed setting unit, or the operation input that decreases the setting travel speed to be lower than current travel speed of the host vehicle, is performed after the lane change is started, the lane change control unit cancels the lane change.

2. The vehicle control device according to claim 1, wherein if the operation input that decreases the setting travel speed by more than or equal to the predetermined degree, or the operation input that decreases the setting travel speed to be lower than the current travel speed of the host vehicle, is performed after the lane change to overtake a preceding vehicle is started, the lane change control unit cancels the lane change.

3. The vehicle control device according to claim 2, wherein when canceling the lane change in a state where the host vehicle and the preceding vehicle travel side by side, the lane change control unit positions the host vehicle behind the preceding vehicle.

4. The vehicle control device according to claim 1, wherein when a lane to which the host vehicle shifts is a lane that leads to a destination, the lane change control unit does not cancel the lane change even if the operation input that decreases the setting travel speed by more than or equal to the predetermined degree, or the operation input that decreases the setting travel speed to be lower than the current travel speed of the host vehicle, is performed after the lane change is started.

5. The vehicle control device according to claim 1, wherein, in a case where a host vehicle lane that is a lane where the host vehicle travels disappears ahead of the host vehicle, the lane change control unit does not cancel the lane change even if the operation input that decreases the setting travel speed by more than or equal to the predetermined degree, or the operation input that decreases the setting travel speed to be lower than the current travel speed of the host vehicle, is performed after the lane change is started.

6. A vehicle comprising a vehicle control device, the vehicle control device comprising:
    an operation detection unit configured to detect an operation input of a user for an operation input unit;
    a speed setting unit configured to set travel speed of a host vehicle on a basis of the operation input that is detected by the operation detection unit; and
    a lane change control unit configured to control lane change, wherein if the operation input that decreases, by more than or equal to a predetermined degree, setting travel speed that is the travel speed set by the speed setting unit, or the operation input that decreases the setting travel speed to be lower than current travel speed of the host vehicle, is performed after the lane change is started, the lane change control unit cancels the lane change.

7. A vehicle control method comprising steps of:

setting travel speed of a host vehicle on a basis of operation input that is performed by a user; and controlling lane change, wherein in the step of controlling the lane change, if the operation input that decreases, by more than or equal to a predetermined degree, setting travel speed that is the travel speed set in the step of setting the travel speed, or the operation input that decreases the setting travel speed to be lower than current travel speed of the host vehicle, is performed after the lane change is started, the lane change is canceled.

\* \* \* \* \*